UNITED STATES PATENT OFFICE.

PAUL JULIUS AND FRITZ GÜNTHER, OF LUDWIGSHAFEN, GERMANY, ASSIGNORS TO BADISCHE ANILIN UND SODA FABRIK, OF LUDWIGSHAFEN, GERMANY, A CORPORATION OF BADEN.

COMPOUND SUITABLE FOR PRODUCING COLORING-MATTER.

SPECIFICATION forming part of Letters Patent No. 713,447, dated November 11, 1902.

Application filed July 18, 1902. Serial No. 116,103. (No specimens.)

*To all whom it may concern:*

Be it known that we, PAUL JULIUS, a subject of the Emperor of Austria-Hungary, and FRITZ GÜNTHER, a subject of the King of Prussia, German Emperor, doctors of philosophy and chemists, both residing at Ludswigshafen-on-the-Rhine, in the Kingdom of Bavaria, Germany, have invented new and useful Improvements in Compound Suitable for Producing Coloring-Matter, of which the following is a specification.

It is known that ortho-nitro-phenetol can be condensed with formaldehyde to form a compound which has been termed "dinitro-diethoxy-diphenyl-methane." We find that in a similar manner ortho-nitro-anisol can be condensed with formaldehyde to form what we regard as dinitro-dimethoxy-diphenyl-methane, which probably possesses the chemical constitution represented by the formula

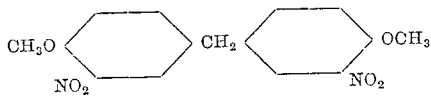

We have discovered that the above body can be reduced, giving rise to a diamido base, which is of great utility in the arts, especially for the production of azo coloring-matter.

In the following example we show how our new diamido base can be obtained and describe some of its properties. The parts are by weight.

Example: Dissolve at a temperature of fifteen to twenty degrees centigrade (15° to 20° C.) one hundred and fifty-three (153) parts of ortho-nitro-anisol in five hundred parts (500 parts) of concentrated sulfuric acid, 96% (ninety-six per cent.) $H_2SO_4$. Gradually introduce into the mixture while maintaining a temperature of zero to ten degrees centigrade (0° to 10° C.) thirty-eight (38) parts of formaldehyde containing 40% (forty per cent.) $CH_2O$. Stir the mass, which soon becomes thick owing to separation of the condensation product, until the smell of formaldehyde has practically disappeared, then pour the whole into five thousand (5,000) parts of water, filter, and wash with water until no more acid reaction is shown by the wash-water. Rub up the condensation product thus obtained into a fine paste, gradually introduce it at a temperature of about one hundred degrees centigrade (100° C.) into a continually-stirred mixture of two hundred and fifty (250) parts of finely-divided iron, five hundred (500) parts of water, and thirty (30) parts of acetic acid containing about 30% (thirty per cent.) of $C_2H_4O_2$. When reduction is complete, make the mixture alkaline by the addition of about eleven (11) parts of anhydrous sodium carbonate, and when cold filter off the precipitate of iron mud with which the insoluble basic product of the reaction is mixed. Extract the base from the iron mud by means of alcohol. On evaporating off the alcohol the base remains behind as a colored mass. This can be converted into the hydrochlorid and so purified by dissolving it in water with the addition of sufficient hydrochloric acid and precipitating it from this solution by means of common salt.

The free diamido base is easily soluble in benzene, chloroform, alcohol, but practically insolubl in water. In the form of its hydrochlorid it is easily soluble in water, and sodium carbonate precipitates the base from an aqueous solution of a salt thereof. The free base is difficultly soluble in boiling legroin and can be obtained by repeated crystallization therefrom as white crystals, which melt at about one hundred and seven degrees centigrade, (107° C.) When treated with nitrous acid, in the presence of sufficient hydrochloric acid, it forms a tetrazo compound, which combines with beta-naphthol-sodium to form a red coloring-matter of excellent properties, which is practically insoluble in water.

This coloring-matter can be produced on the fiber in the manner usual for such purpose, or can be produced in the presence of a suitable substratum to form a coloring-matter lake.

We claim—

The hereinbefore-mentioned diamido base which can be obtained by reducing dinitrodimethoxy-diphenyl-methane which, in the form of the free base is soluble in benzene, chloroform and alcohol but practically insoluble in water, which in the form of its hydrochlorid is easily soluble in water, which melts at about 107° C. (one hundred and seven degrees centigrade), which with nitrous acid yields a tetrazo compound which combines with beta-naphthol to form a red coloring-matter.

In testimony whereof we have hereunto set our hands in the presence of two subscribing witnesses.

PAUL JULIUS.
FRITZ GÜNTHER.

Witnesses:
ERNEST G. EHRHARDT,
JOHN L. HEINKE.